United States Patent [19]

Hirth

[11] Patent Number: 5,193,032
[45] Date of Patent: Mar. 9, 1993

[54] UNIVERSAL PRESCRIPTION BOTTLE INSTRUCTION LABEL MAGNIFIER

[76] Inventor: Frederick A. Hirth, 37547 Arbor La., Palmdale, Calif. 93552

[21] Appl. No.: 854,039

[22] Filed: Mar. 19, 1992

[51] Int. Cl.⁵ .............................................. G02B 27/02
[52] U.S. Cl. .................... 359/804; 359/436; 359/442; 374/191
[58] Field of Search ............... 359/802, 803, 804, 808, 359/809, 810, 811, 812, 815, 436, 440, 441, 442; 374/191, 194; 356/240

[56] References Cited

U.S. PATENT DOCUMENTS

| | | | |
|---|---|---|---|
| 2,460,051 | 1/1949 | Welch | 374/191 |
| 2,586,581 | 2/1952 | Tschischeck | 359/442 |
| 2,712,237 | 7/1955 | Margolis | 374/191 |
| 2,787,937 | 4/1957 | Prisament | 88/39 |
| 2,961,108 | 11/1960 | Johnson | 215/37 |
| 3,052,158 | 9/1962 | Sonni | 374/191 |
| 3,762,799 | 10/1973 | Shapiro | 359/442 |
| 4,435,094 | 3/1984 | Shapiro | 359/442 |

Primary Examiner—Loha Ben
Attorney, Agent, or Firm—John J. Posta, Jr.

[57] ABSTRACT

A device for use as a magnifying implement is disclosed which has a housing member designed to accommodate prescription bottles of various popular sizes therein in a fixed position. A longitudinally moveable magnifying lens slideably mounted in the housing member is utilized to magnify the print contained on an instruction label located on the side of the prescription bottle. Alternate embodiments allow different size medicine bottles to be alternately mounted in concentric fashion, or with the side of the medicine bottles facing the lens in a fixed position.

21 Claims, 2 Drawing Sheets

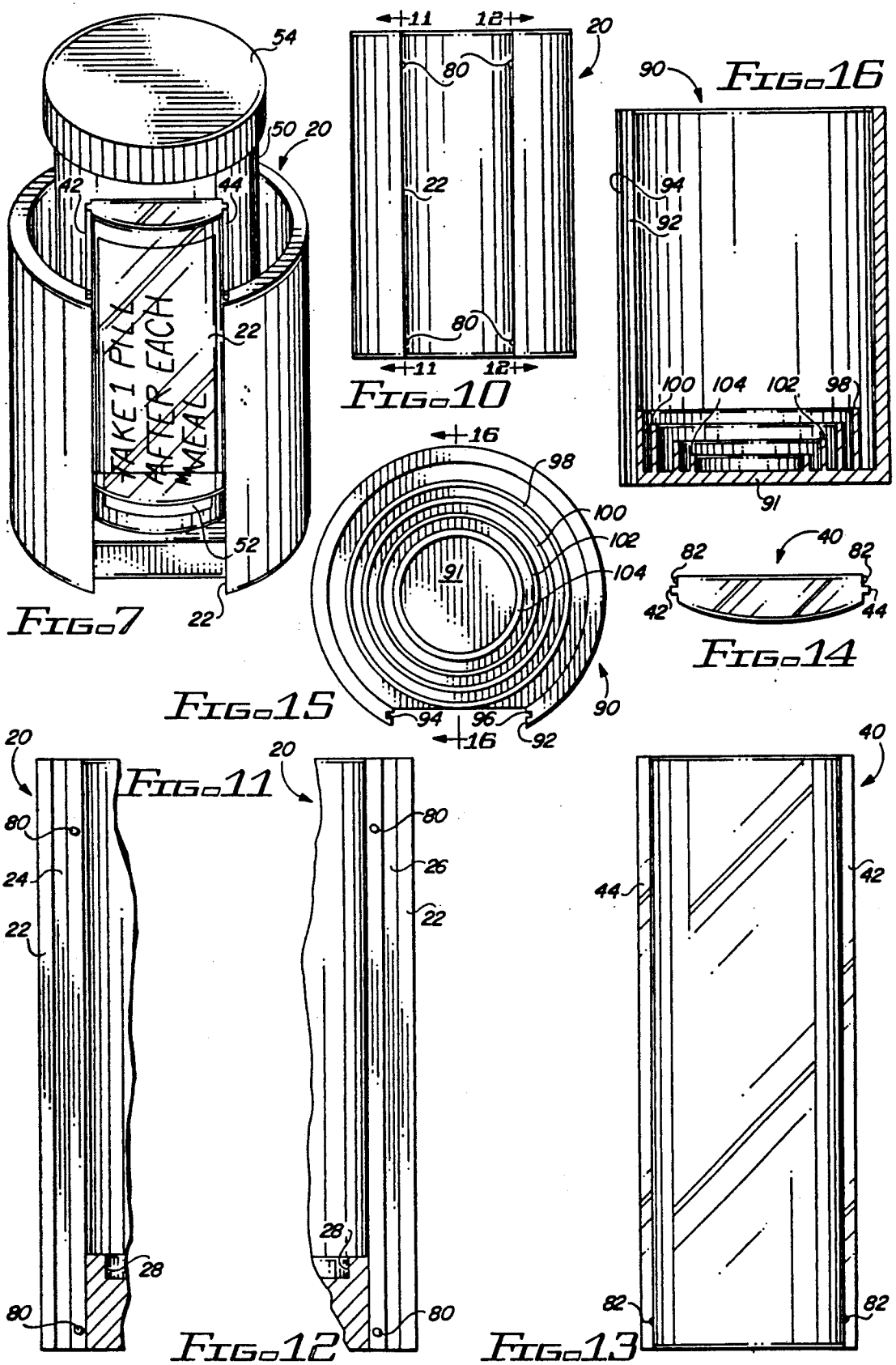

UNIVERSAL PRESCRIPTION BOTTLE INSTRUCTION LABEL MAGNIFIER

BACKGROUND OF THE INVENTION

Field of the Invention

The present invention relates generally to a magnifying implement, and more particularly to an apparatus having a housing member designed to accommodate prescription bottles of various popular sizes therein in a position wherein a longitudinally moveable magnifying lens slideably mounted in the housing member may be utilized to magnify the print contained on an instruction label located on the side of a prescription bottle.

As people grow older, one of the commonplace afflictions affecting many of them is gradually diminishing eyesight. In particular, one of the most prevalent conditions affecting most people at some point in their lives is the ever-increasing inability to read small print. This can affect the ability of people thusly affected to read everything from a newspaper to highway signs to the characters on a computer screen.

One particular problem of the far-reaching affects of substandard vision is graphically illustrated by its solution, as shown in U.S. Pat. No. 4,044,889, to Orentreich et al. This reference discloses a woman's lipstick dispenser having a cover with a magnifying lens included therein. The magnifying lens enhances a visually impaired user's ability to read the fine print on the label of the lipstick dispenser.

One particular area in which small characters present a particular problem is the area of medicine and medical devices. Syringes, for example, have small print on the side of the syringe barrel which indicate how much fluid is contained in the syringe. In U.S. Pat. No. 2,586,581, to Tschischeck, a magnifying attachment for syringes is disclosed which uses a concave lens slideably attached to the outside of a syringe barrel to make the print on the side of the syringe barrel more readable.

It seems that the medical apparatus which has presented one of the most significant challenges is the simple thermometer, which even people with fairly good vision often have trouble reading. The art is replete with examples of proposed solutions to this particular problem, as illustrated by an alternate embodiment of the Tschischeck reference mentioned above, as well as by U.S Pat. No. 2,712,237, to Margolis, by U.S. Pat. No. 2,787,937, to Prisament, and by U.S. Pat. No. 3,052,158, to Sonni. The apparatus taught in these references present various designs for enlarging lens which may be attached to the thermometers, or, alternately, for devices in which thermometers may be placed in order to facilitate reading them easily.

One of the problems in the medical area which affects far more people on a day-to-day basis is the problem of the difficulty or the inability to read the label on a prescription bottle due to the virtually universal use of small print on the label. The potential for serious problems due to an inability or a seriously impaired ability to read the instruction label on a prescription medication bottle is extremely high. The problems vary from not taking a medication as often as prescribed or when prescribed, to taking the medication too often, to taking the medication improperly or in conjunction with another contraindicated medicine, to taking the wrong medication inadvertently due to a similarity in the size of medicine bottles.

It has become a common sight in many homes to see on the shelf on which the medicine bottles are stored a hand-held magnifying glass. Indeed, many pharmacies carry such magnifying glasses and display them near the prescription counter. While this problem has been a common one for many years, the art has produced little to remedy the problem. In U.S. Pat. No. 2,961,108, to Johnson, a magnifying cap for medicine bottles is disclosed. The Johnson reference certainly represents a step in the right direction, but since the typical medicine bottle cap is only an inch or so in diameter, the magnifying cap is too small to allow an instruction label to be easily read. A clear majority of people would prefer a standard magnifying glass with a three inch lens which can read the entire label.

It is accordingly the primary objective of the present invention that it provide an apparatus which can be utilized to magnify the instruction label of a medicine bottle. The magnifying element must be of a size to read the entire label without requiring the user to scan back and forth with the magnifier. In addition, the magnifying element must produce a level of magnification allowing the instruction label to be easily read by someone with substandard vision.

It is an additional objective of the present invention that it position the medicine bottle with respect to the magnifying element to provide the optimum level of magnification to the user. In addition, it is desirable that the design of the present invention allow for its use with a variety of different sizes of medicine bottles. Since there are three or four different sizes which are widely used today, the present invention should advantageously accommodate all of them without requiring a difficult adjustment.

The apparatus of the present invention must also be of construction which is both durable and long lasting, and it should also require little or no maintenance to be provided by the user. In order to enhance the market appeal of the apparatus of the present invention, it should also be of inexpensive construction to thereby afford it the broadest possible market. Finally, it is also an objective that all of the aforesaid advantages and objectives of the present invention be achieved without incurring any substantial relative disadvantage.

SUMMARY OF THE INVENTION

The disadvantages and limitations of the background art discussed above are overcome by the present invention. With this invention, provision is made for mounting a medicine bottle inside a cylindrical housing member. In the preferred embodiment, the housing member has a plurality of recesses of different diameters located in the bottom of the housing member. Consecutively smaller diameter recesses are located in the larger diameter recesses, and extend ever deeper into the bottom of the housing member. Four different diameter recesses are located in the bottom of the housing member of the preferred embodiment to accommodate the four most common sizes of prescription medicine bottles.

A longitudinally extending slot is located in the side of the housing member. A lens member is slideably mounted in the longitudinally extending slot in the medicine bottle. The lens member is preferably a convex lens which is rectangular in configuration, and is sufficiently large to allow the entire instruction label on a medicine bottle to be read. The lens member may be slid upwardwardly with respect to the housing member if the medicine bottle mounted in the housing member is longer than the length of the housing member to allow the entire label to be viewed.

In a first embodiment, the four recesses are cylindrical and are located in step fashion in the bottom of the housing member, with consecutively smaller diameter recesses being located within larger recesses in concentric fashion. In a second embodiment, the four recesses, cylindrical and located again in step fashion in the bottom of the housing member, are arranged with a common point of intersection. This common point of intersection is oriented toward the center of the longitudinally extending slot.

In a third embodiment, instead of consecutive recesses, four thin cylindrical segments are located in the bottom on the housing member and extend upwardly. The thin cylindrical segments are located inside each other, with the larger segments extending higher than the smaller segments in a uniform progression.

The lens member is in the preferred embodiment flat on the side facing a medicine bottle placed in the housing member, with the front side of the lens member being a convex lens. The lens member is thus a single convex lens. Alternately, a double convex lens with different curvatures allowing for sufficient magnification may be used instead. The lens member is mounted in a slideable fashion in the longitudinally extending slot in the housing member. In one embodiment, small engaging protrusions are located on the housing member and on the lens member to retain the lens member in the slot in the housing member and to restrict its longitudinal movement in the slot.

It may therefore be seen that the present invention teaches a magnifier which can be utilized to magnify the instruction label of a medicine bottle. The magnifying element is of a size allowing the entire label to be read without requiring the user to scan the magnifier back and forth with respect to the medicine bottle. In addition, the magnifying element produces a level of magnification allowing the instruction label to be easily read by someone with substandard vision.

The magnifier of the present invention positions the medicine bottle with respect to the magnifying element to provide the optimum level of magnification to the user. In addition, the design of the present invention accommodates any of a variety of different sizes of medicine bottles. The present invention advantageously accommodates the three or four different most widely used sizes, without requiring a difficult adjustment.

The apparatus of the present invention is also of construction which is both durable and long lasting, and it requires no maintenance to be provided by the user other than protecting the lens member from scratches. The magnifier of the present invention is of inexpensive construction to thereby afford it the broadest possible market. Finally, all of the aforesaid advantages and objectives of the present invention are achieved without incurring any substantial relative disadvantage.

DESCRIPTION OF THE DRAWINGS

These and other advantages of the present invention are best understood with reference to the drawings, in which:

FIG. 7 is an isometric view showing the housing member illustrated in FIGS. 1 through 3 with the lens member illustrated in FIGS. 4 and 5 installed therein, and also showing a medicine bottle mounted in the housing member, and the lens member slid longitudinally upwardly to enlarge the entire instruction label on the side of the medicine bottle;

FIG. 10 is a front plan view of a cylindrical housing member similar to the one illustrated in FIG. 1, showing the locations of small protrusions extending from the side portions of the housing member forming the longitudinally extending slot;

FIG. 11 is a side view of one of the side portions of the housing member illustrated in FIG. 10, showing the locations of the small protrusions extending from the side portions of the housing member forming the longitudinally extending slot;

FIG. 12 is a side view of the other of the side portions of the housing member illustrated in FIG. 10, showing the locations of the small protrusions extending from the side portions of the housing member forming the longitudinally extending slot;

FIG. 13 is a rear plan view of a rectangular lens member similar to the one illustrated in FIGS. 5 and 6, showing the locations of the small protrusions extending from the sides of the lens member adjacent the longitudinal tabs;

FIG. 14 is a top plan view of the lens member illustrated in FIG. 13, showing the locations of the small protrusions extending from the sides of the lens member adjacent the longitudinal tabs;

FIG. 15 is a top plan view of a third embodiment of a cylindrical housing member having a longitudinally extending slot in the side of the housing member with slots located in the side portions of the housing member forming the longitudinally extending slot, showing four thin cylindrical segments extending upwardly from the bottom of the housing member; and FIG. 16 is a cross-sectional view of the housing member illustrated in FIG. 15, showing the progressively lower heights of consecutively smaller diameter thin cylindrical segments.

Corresponding reference characters are used throughout the detailed description to indicate corresponding components of elements of the invention as depicted throughout the several views of the drawings.

DETAILED DESCRIPTION OF THE PREFERRED EMBODIMENT

Figure 5:
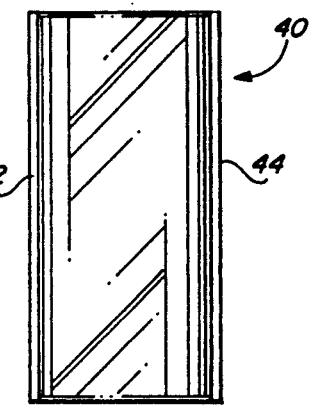
FIG. 5 is a front plan view of a rectangular lens member which is a single convex lens, showing two longitudinal tabs extending from the sides of the lens member.
Figure 6:
FIG. 6 is a top plan view of the lens member illustrated in FIG. 5, showing the single convex construction of the lens member, and also showing the two longitudinal tabs extending from the sides of the lens member.

The basic embodiment of the magnifier of the present invention consists of two members: a housing member 20, illustrated in FIGS. 1 through 4, and a lens member 40, illustrated in FIGS. 5 and 6. Referring first to FIGS. 1 through 4, the housing member 20 is essentially cylindrical in configuration, having essentially cylindrical side walls with an open top end and an essentially closed bottom end. The housing member 20 is preferably made of injection molded plastic material, such as polystyrene. By way of example, the housing member 20 may be approximately 2¼ to 2½ inches in height, and have a diameter of approximately 2 inches. The housing member 20 has a longitudinally extending slot 22 located therein which extends essentially the entire height of the housing member 20.

Figure 1:
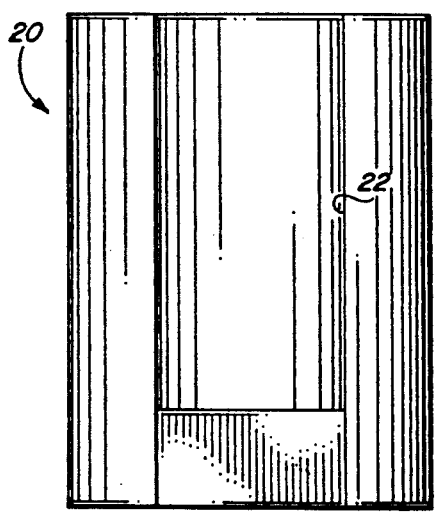
FIG. 1 is a front plan view of a first embodiment of a cylindrical housing member, showing a longitudinally extending slot in the side of the housing member.
Figure 2:
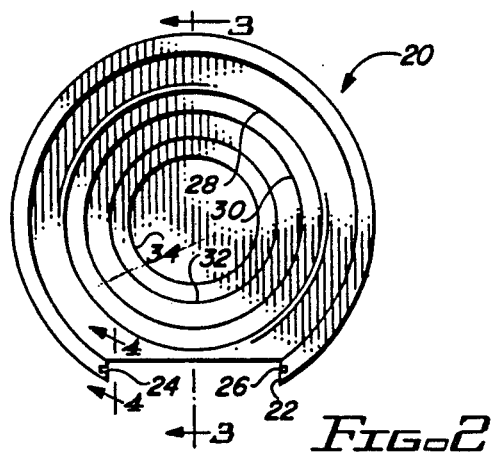
FIG. 2 is a top plan view of the housing member illustrated in FIG. 1, showing the cylindrical recesses located in concentric step fashion in the bottom of the housing member, and also showing the slots located in the side portions of the housing member forming the longitudinally extending slot.

The longitudinally extending slot 22 is thus defined between two side portions of the cylindrical portion of the housing member 20. The edges of these two side portions of the housing member 20 face each other, as best shown in FIG. 2. Located in each of the edges of these two side portions of the housing member 20 is a longitudinally extending slot extending the entire height of the edges of the side portions. A slot 24 (best shown in FIG. 4) is located in the edge of the side portion of the housing member 20 on the left side (as shown in FIG. 1) of the longitudinally extending slot 22. A slot 26 is located in the edge of the side portion of the housing member 20 on the right side (as shown in FIG. 1) of the longitudinally extending slot 22.

Located in the bottom of the housing member 20 are four cylindrical recesses 28, 30, 32, and 34 which are located with each smaller recess being wholly contained within the next size larger recess. The cylindrical recesses 28, 30, 32, and 34 consecutively decrease in diameter, from the largest cylindrical recess 28 to the smallest cylindrical recess 34. The diameters of the cylindrical recesses 28, 30, 32, and 34 are sized to fit the sizes of popular medicine bottles. There may also be more than or less than four recesses if desired.

Figure 3:
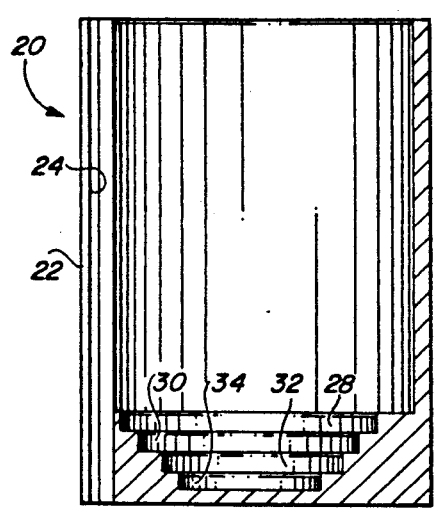
FIG. 3 is a cross-sectional view of the housing member illustrated in FIGS. 1 and 2, showing the step fashion in which the four cylindrical recesses are located in the bottom of the housing member.
Figure 4:
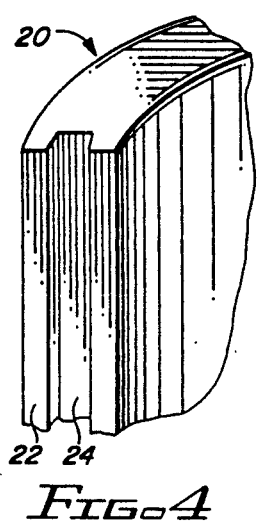
FIG. 4 is a partial isometric view of one of the side portions of the housing member illustrated in FIGS. 1 through 3, showing the slot located in that side portion.

In the embodiment shown in FIGS. 1 through 4, the cylindrical recesses 28, 30, 32, and 34 in the housing member 20 are located concentrically, both with respect to the cylindrical portion of the housing member 20, and with respect to each other. Thus, the cylindrical recesses 28, 30, 32, and 34 form a series of steps as best shown in FIG. 3.

Referring next to FIGS. 5 and 6, the lens member 40 is illustrated. In the preferred embodiment, the lens member 40 is a single convex lens having a rectangular configuration as shown in FIG. 5. The lens member 40 is also preferably made of injection molded clear plastic material, such as polystyrene. By way of the example introduced above, the lens member 40 may be approximately 2¼ to 2½ inches high, approximately 1 inch wide, and approximately ⅛ of an inch thick. Alternately, the lens member 40 could be a double convex lens, with different curvatures requiring a greater thickness to allow for sufficient magnification.

Located on the left side (as shown in FIG. 5) of the lens member 40 is a longitudinally extending tab 42 which extends the entire height of the left side of the lens member 40. Similarly, located on the right side (as shown in FIG. 5) of the lens member 40 is a longitudinally extending tab 44 which extends the entire height of the right side of the lens member 40. The tab 42 of the lens member 40 is for placement into the slot 24 of the housing member 20 to the left side (as shown in FIG. 1) of the longitudinally extending slot 22. Similarly, the tab 44 of the lens member 40 is for placement into the slot 26 of the housing member 20 to the right side (as shown in FIG. 1) of the longitudinally extending slot 22.

Referring next to FIG. 7, the lens member 40 is shown assembled to the housing member 20 as described above. The lens member 40 will be free to move longitudinally in the longitudinally extending slot 22 in the housing member 20. In FIG. 7, a medicine bottle 50 having an instruction label 52 and a cap 54 is illustrated mounted in the housing member 20 in the corresponding one of the cylindrical recesses 28, 30, 32, and 34 (FIGS. 2 and 3). The lens member 40 is illustrated in position to read the instruction label 52 on the medicine bottle 50.

Figure 8:
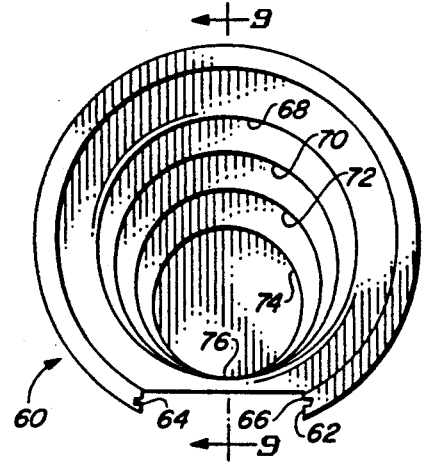
FIG. 8 is a top plan view of a second embodiment of a cylindrical housing member having a longitudinally extending slot in the side of the housing member with slots located in the side portions of the housing member forming the longitudinally extending slot, showing cylindrical recesses having a common point of intersection located in step fashion in the bottom of the housing member with the common point oriented toward the longitudinally extending slot.
Figure 9:
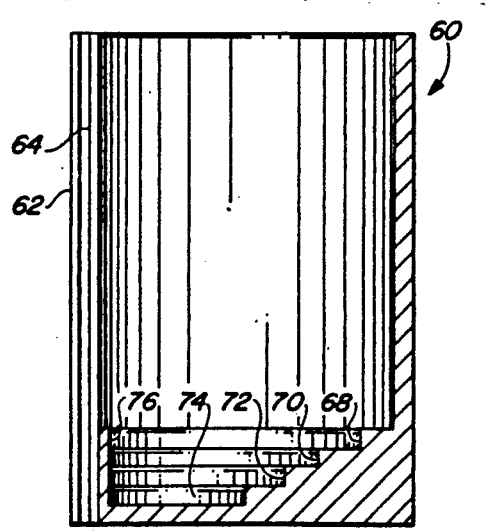
FIG. 9 is a cross-sectional view of the housing member illustrated in FIG. 8, showing both the common point and the step fashion in which the four cylindrical recesses are located in the bottom of the housing member.

Referring next to FIGS. 8 and 9, a second embodiment housing member 60 is shown which is similar to the housing member 20 illustrated in FIGS. 1 through 4. The housing member 60 has a longitudinally extending slot 62 located therein which extends the entire height of the housing member 60. The longitudinally extending slot 62 is thus defined between two side portions of the cylindrical portion of the housing member 60. The edges of these two side portions of the housing member 60 face each other, as best shown in FIG. 8.

Located in each of the edges of these two side portions of the housing member 60 is a longitudinally extending slot extending the entire height of the edges of the side portions. A slot 64 is located in the edge of the side portion of the housing member 60 on the left side (as shown in FIG. 8) of the longitudinally extending slot 62. A slot 66 is located in the edge of the side portion of the housing member 60 on the right side (as shown in FIG. 8) of the longitudinally extending slot 62. The longitudinally extending slot 62 of the housing member 60 is thus similar to the longitudinally extending slot 22 of the housing member 20. The slots 64 and 66 in the housing member 60 thus correspond to the slots 24 and 26, respectively, in the housing member 20.

Located in the bottom of the housing member 60 are four cylindrical recesses 68, 70, 72, and 74, which are again located with each smaller recess being wholly contained within the next size larger recess. The cylindrical recesses 68, 70, 72, and 74 consecutively decrease in diameter, from the largest cylindrical recess 68 to the smallest cylindrical recess 74. The diameters of the cylindrical recesses 68, 70, 72, and 74 are sized to fit the sizes of popular medicine bottles. There may also be more than or less than four recesses if desired.

In the embodiment shown in FIGS. 8 and 9, the cylindrical recesses 68, 70, 72, and 74 in the housing member 60 are not located concentrically. Rather, they are located so that all four of the cylindrical recesses 68, 70, 72, and 74 intersect at a common point 76. The common point 76 is oriented toward the side of the housing member 60 in which the longitudinally extending slot 62 is located, with the common point 76 being aligned with the center of the longitudinally extending slot 62. At all locations except at the common point 76, the cylindrical recesses 68, 70, 72, and 74 form a series of steps as best shown in FIG. 9.

The point of the placement of the cylindrical recesses 68, 70, 72, and 74 as shown in FIGS. 8 and 9 is to place the label side of a medicine bottle (not shown) (which bottle is any one of the four sizes) in the same place, regardless of which one of the cylindrical recesses 68, 70, 72, and 74 the medicine bottle is placed in. Thus, the focus and magnification of the longitudinally extending slot 62 will be essentially identical regardless of the size of the medicine bottle.

Referring next to FIGS. 10 through 12, the housing member 20 of FIGS. 1 through 4 is again illustrated, but with the addition of two small protrusions 80 extending from each of the side portions of the housing member 20 forming the longitudinally extending slot 22. A first pair of the small protrusions 80 are located on the edge of the side portion of the housing member 20 o the left side (as shown in FIG. 10) on the inner side of the slot 24 as shown in FIG. 11. One of this first pair of small protrusions 80 is located near the bottom of the edge of the side portion of the housing member 20, and the other of this first pair of small protrusions 80 is located approximately one-half inch below the top of the edge of the same side portion of the housing member 20, as shown in FIGS. 10 and 11.

The second pair of the small protrusions 80 are located on the edge of the side portion of the housing member 20 on the right side (as shown in FIG. 10) on the inner side of the slot 26 as shown in FIG. 12. One of this second pair of small protrusions 80 is located near the bottom of the edge of the side portion of the housing member 20, and the other of these small protrusions 80 is located approximately one-half inch below the top of the edge of the same side portion of the housing member 20, as shown in FIGS. 10 and 12.

Referring now to FIGS. 13 and 14, the lens member 40 of FIGS. 5 and 6 is again illustrated, but with the addition of a small protrusion 82 extending from each of the sides of the lens member 40. A first small protrusion 82 is located on the left side (as shown in FIG. 14) of the lens member 40 on the inner side of the tab 42 as shown in FIG. 14. The second small protrusion 82 is located on the right side (as shown in FIG. 14) of the lens member 40 on the inner side of the tab 44 as shown in FIG. 14. These small protrusions 82 are located near the bottom of the edges of the lens member 40, as shown in FIG. 13.

Once the lens member 40 with the small protrusions 82 is installed in the housing member 20 with the small protrusions 80, the lens member 40 will be retained in the housing member 20. The bottom edge of the lens member 40 will not easily slide below the bottom of the housing member 20 due to the small protrusions 82 on the lens member 40 contacting the bottom two small protrusions 80 on the housing member 20. Similarly, the lens member 40 will not easily slide out of the top of the housing member 20 due to the small protrusions 82 on the lens member 40 contacting the top two small protrusions 80 on the housing member 20.

Referring finally to FIGS. 15 and 16, a third embodiment housing member 90 is shown which is similar to the housing member 20 illustrated in FIGS. 1 through 4. The housing member 90 has a flat bottom member 91. The housing member 90 has a longitudinally extending slot 92 located therein which extends the entire height of the housing member 90. The longitudinally extending slot 92 is thus defined between two side portions of the cylindrical portion of the housing member 90. The edges of these two side portions of the housing member 90 face each other, as best shown in FIG. 15.

Located in each of the edges of these two side portion of the housing member 90 is a longitudinally extending slot extending the entire height of the edges of the side portions. A slot 94 is located in the edge of the side portion of the housing member 90 on the left side (as shown in FIG. 15) of the longitudinally extending slot 92. A slot 96 is located in the edge of the side portion of the housing member 90 on the right side (as shown in FIG. 15) of the longitudinally extending slot 92. The longitudinally extending slot 92 of the housing member 90 is thus similar to the longitudinally extending slot 22 of the housing member 20. The slots 94 and 96 in the housing member 90 thus correspond to the slots 24 and 26, respectively, in the housing member 20.

Located in the bottom of the housing member 90 are four thin cylindrical segments 98, 100, 102, and 104 which extend upwardly from the bottom of the housing member 90. The inner diameters of the thin cylindrical segments 98, 100, 102, and 104 consecutively decrease in diameter, from the largest thin cylindrical segment 98 to the smallest thin cylindrical segment 104. The diameters of the thin cylindrical segments 98, 100, 102, and 104 are sized to fit the sizes of popular medicine bottles. There may also be more than or less than four cylindrical segments if desired.

Referring now to FIG. 16, the heights of the thin cylindrical segments 98, 100, 102, and 104 also consecutively decrease, from the highest thin cylindrical segment 98 to the lowest thin cylindrical segment 104. In the embodiment shown in FIGS. 15 and 16, the thin cylindrical segments 98, 100, 102, and 104 in the housing member 90 are located concentrically, both with respect to the cylindrical portion of the housing member 90, and with respect to each other. The tops and inner diameters of the thin cylindrical segments 98, 100, 102, and 104 form the functional equivalent of the series of steps of cylindrical recesses 28, 30, 32, and 34 in the housing member 20 (FIG. 3).

It may therefore be appreciated from the above detailed description of the preferred embodiment of the present invention that it teaches a magnifier which can be utilized to magnify the instruction label of a medicine bottle. The magnifying element is of a size allowing the entire label to be read without requiring the user to scan the magnifier back and forth with respect to the medicine bottle. In addition, the magnifying element produces a level of magnification allowing the instruction label to be easily read by someone with substandard vision.

The magnifier of the present invention positions the medicine bottle with respect to the magnifying element to provide the optimum level of magnification to the user. In addition, the design of the present invention accommodates any of a variety of different sizes of medicine bottles. The present invention advantageously accommodates the three or four different most widely used sizes, without requiring a difficult adjustment.

The apparatus of the present invention is also of construction which is both durable and long lasting, and it requires no maintenance to be provided by the user other than protecting the lens member from scratches. The magnifier of the present invention is of inexpensive construction to thereby afford it the broadest possible market. Finally, all of the aforesaid advantages and objectives of the present invention are achieved without incurring any substantial relative disadvantage.

Although an exemplary embodiment of the present invention has been shown and described, it will be apparent to those having ordinary skill in the art that a number of changes, modifications, or alterations to the invention as described herein may be made, none of which depart from the spirit of the present invention. All such changes, modifications, and alterations should therefore be seen as within the scope of the present invention.

What is claimed is:

1. An apparatus for magnifying the instruction label on a medicine bottle, comprising:
   a housing member having side walls, an open top side, and a bottom side;
   receiving means, located in said bottom side of said housing member, for receiving one of a plurality of different sizes of medicine bottles inserted into said housing member through said open top side of said housing member;
   a longitudinally extending slot located in said side walls of said housing member, said longitudinally extending slot being open on said top side of said housing member; and
   a lens member for magnifying the instruction label on a medicine bottle, said lens member being installed in said longitudinally extending slot.

2. An apparatus as defined in claim 1, wherein said housing member is essentially cylindrical and has an essentially closed bottom side.

3. An apparatus as defined in claim 1, wherein said housing member is made of molded plastic material.

4. An apparatus as defined in claim 1, wherein said housing member is approximately 2¼ to 2½ inches in height, and has a diameter of approximately 2 inches.

5. An apparatus as defined in claim 1, wherein said longitudinally extending slot in said housing member extends essentially the entire height of the housing member.

6. An apparatus as defined in claim 1, wherein said lens member is essentially rectangular in configuration.

7. An apparatus as defined in claim 1, wherein said lens member is made of molded clear plastic material.

8. An apparatus as defined in claim 1, wherein said lens member is approximately 2¼ to 2½ inches high, approximately 1 inch wide, and approximately ⅜ of an inch thick.

9. An apparatus as defined in claim 1, wherein said lens member is a convex lens.

10. An apparatus as defined in claim 1, wherein said lens member is a double convex lens.

11. An apparatus as defined in claim 1, additionally comprising:
    means for installing said lens member in said longitudinally extending slot in longitudinally moveable fashion.

12. An apparatus as defined in claim 11, wherein said longitudinally extending slot is defined between the edges of two side portions of said side walls of said housing member, said edges of said two side portions of said side walls of said housing member facing each other, and wherein said installing means comprises:
    a longitudinally extending slot located in each of said edges of said two side portions of said side walls of said housing member; and
    a longitudinally extending tab located on each side of said lens member, said longitudinally extending tabs on said lens member for placement into said longitudinally extending slots in said edges of said two side portions of said side walls of said housing member.

13. An apparatus as defined in claim 1, additionally comprising:
    means for retaining said lens member in said longitudinally extending slot once said lens member is so installed.

14. An apparatus as defined in claim 1, wherein said receiving means comprises:
    a plurality of cylindrical recesses located in said bottom side of said housing member with each smaller recess being wholly contained within the next size larger recess, said plurality of cylindrical recesses thus forming a series of steps in said bottom side of said housing member, the diameters of said cylindrical recesses being sized to fit the sizes of popular medicine bottles.

15. An apparatus as defined in claim 14, wherein there are four cylindrical recesses located in said bottom side of said housing member.

16. An apparatus as defined in claim 14, wherein said plurality of cylindrical recesses are located concentrically, both with respect to said housing member and with respect to each other.

17. An apparatus as defined in claim 14, wherein said plurality of cylindrical recesses are located so that all of said cylindrical recesses intersect at a common point, said common point being oriented toward the portion of said side walls of said housing member in which said longitudinally extending slot is located, with said common point being aligned with the center of said longitudinally extending slot.

18. An apparatus as defined in claim 1, wherein said receiving means comprises:
    a plurality of thin cylindrical segments extending upwardly from said bottom side of said housing member, the inner diameters of said thin cylindrical segments consecutively decreasing in diameter from largest to smallest, the heights of said thin cylindrical segments consecutively decreasing in the same order from highest to lowest, the diameters of said thin cylindrical segments being sized to fit the sizes of popular medicine bottles.

19. An apparatus for magnifying the instruction label on a medicine bottle, comprising:
    a housing member having essentially cylindrical side walls with an open top side and an essentially closed bottom side;
    receiving means, located in said bottom side of said housing member, for receiving one of a plurality of different sizes of medicine bottles inserted into said housing member through said open top side of said housing member;
    a longitudinally extending slot located in said side walls of said housing member, said longitudinally extending slot being open on said top side of said housing member; and
    an essentially rectangular convex lens member for magnifying the instruction label on a medicine bottle, said convex lens member being installed in said longitudinally extending slot in longitudinally moveable fashion.

20. An apparatus for magnifying the instruction label on a medicine bottle, comprising:

a housing member;

receiving means, located in said housing member, for receiving one of a plurality of different sizes of medicine bottles inserted into said housing member; and means, installed in said housing member, for magnifying the instruction label on said one of a plurality of different sizes of medicine bottles.

21. A method of magnifying the instruction label on a medicine bottle, comprising:

installing one of a plurality of different sizes of medicine bottles into an open top side of a housing member having essentially cylindrical side walls and an essentially closed bottom side, said one of a plurality of different sizes of medicine bottles being received in one of a plurality of recesses in said bottom side of said housing member, said housing member having a longitudinally extending slot located in said side walls thereof, said longitudinally extending slot being open on said top side of said housing member; and moving an essentially rectangular lens member installed in said longitudinally extending slot in longitudinally moveable fashion to magnify an instruction label on a medicine bottle.

* * * * *